United States Patent [19]

Abbas

[11] Patent Number: 5,544,172
[45] Date of Patent: Aug. 6, 1996

[54] METHOD FOR THE DIGITAL TRANSMISSION OF DATA

[75] Inventor: Ghani Abbas, Nottingham, United Kingdom

[73] Assignee: GPT Limited, United Kingdom

[21] Appl. No.: 226,647

[22] Filed: Apr. 12, 1994

[30] Foreign Application Priority Data

Apr. 14, 1993 [GB] United Kingdom ............. 9307685

[51] Int. Cl.[6] .................................................. H04L 7/04
[52] U.S. Cl. .......................................... 370/102; 370/111
[58] Field of Search .......................... 370/91, 94.2, 99, 370/102, 111, 112

[56] References Cited

U.S. PATENT DOCUMENTS

| | | | |
|---|---|---|---|
| 5,033,044 | 7/1991 | Williams et al. ................ | 370/105.1 |
| 5,091,907 | 2/1992 | Wettengel ........................ | 370/99 |
| 5,172,376 | 12/1992 | Chopping et al. .............. | 370/100.1 |
| 5,287,360 | 2/1994 | Regent ............................. | 370/102 |
| 5,331,630 | 7/1994 | Fujita et al. ..................... | 370/102 |
| 5,331,671 | 7/1994 | Urbansky ........................ | 370/102 |

FOREIGN PATENT DOCUMENTS

| | | |
|---|---|---|
| 0460835A2 | 12/1991 | European Pat. Off. . |
| 2249002 | 4/1992 | United Kingdom . |
| 2260469 | 4/1993 | United Kingdom . |

*Primary Examiner*—Benedict V. Safourek
*Attorney, Agent, or Firm*—Kirschstein, et al.

[57] ABSTRACT

Timing pointer signals to be transmitted across a synchronous digital hierarcy (SDH) network are transmitted in virtual containers (VC) in a number of fixed stuff bytes which were hitherto unused. In a preferred embodiment two such bytes are used to carry the timing information which allows for up to a sixteen bit code to be provided for the timing pointers.

8 Claims, 5 Drawing Sheets

R = FIXED STUFF BIT
C = JUSTIFICATION CONTROL BIT
S = JUSTIFICATION OPPORTUNITY BIT
I = INFORMATION BIT
O = OVERHEAD BIT

THESE BYTES MAYBE USED TO CARRY TIMING INFORMATION

R = FIXED STUFF BIT
C = JUSTIFICATION CONTROL BIT
S = JUSTIFICATION OPPORTUNITY BIT
I = INFORMATION BIT
O = OVERHEAD BIT

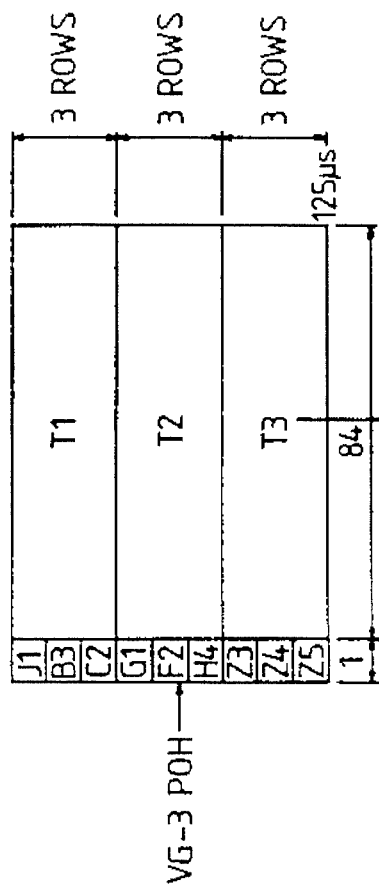
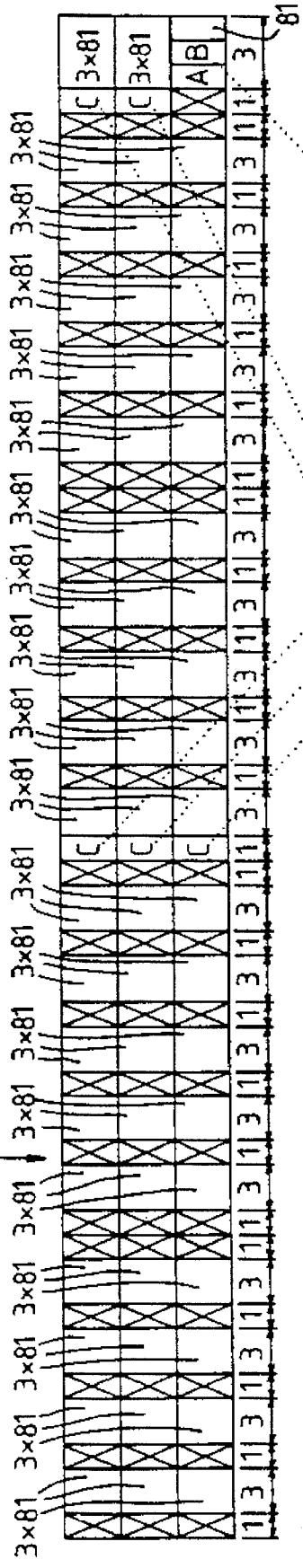
Fig. 3.

Fig. 4.

| | | | |
|---|---|---|---|
| VS | I I I I I I I R | (24×8)I | R |
| R | C₁C₂0 0 0 0 I R | (24×8)I | R |
| I I I I I I I I | C₁C₂0 0 0 0 I R | (24×8)I | R |
| R | C₁C₂I I IS₁S₂R | (24×8)I | |
| J2 | I I I I I I R | (24×8)I | R |
| R | C₁C₂0 0 0 0 I R | (24×8)I | R |
| I I I I I I I I | C₁C₂0 0 0 0 I R | (24×8)I | R |
| R | C₁C₂I I IS₁S₂R | (24×8)I | |
| Z6 | I I I I I I R | (24×8)I | R |
| R | C₁C₂0 0 0 0 I R | (24×8)I | R |
| I I I I I I I I | C₁C₂0 0 0 0 I R | (24×8)I | R |
| R | C₁C₂I I IS₁S₂R | (24×8)I | |
| Z7 | I I I I I I R | (24×8)I | R |
| R | C₁C₂0 0 0 0 I R | (24×8)I | R |
| I I I I I I I I | C₁C₂0 0 0 0 I R | (24×8)I | R |
| R | C₁C₂I I IS₁S₂R | (24×8)I | |

Timing: 125μs, 250μs, 375μs, 500μs

R = FIXED STUFF → THESE BYTES MAY BE USED TO CARRY TIMING INFORMATION
C = JUSTIFICATION CONTROL BIT
S = JUSTIFICATION OPPORTUNITY BIT
I = INFORMATION BIT
O = OVERHEAD BIT

Fig. 5.

| | | | |
|---|---|---|---|
| VS | I I I I I I I R | (24×8)I | R |
| R | I 0 0 0 0 0 I R | (24×8)I | R |
| I I I I I I I I | I 0 0 0 0 0 I R | (24×8)I | R |
| R | I 0 I I I R I R | (24×8)I | |
| J2 | I I I I I I R | (24×8)I | R |
| R | I 0 0 0 0 0 I R | (24×8)I | R |
| I I I I I I I I | I 0 0 0 0 0 I R | (24×8)I | R |
| R | I 0 I I I R I R | (24×8)I | |
| Z6 | I I I I I I R | (24×8)I | R |
| R | I 0 0 0 0 0 I R | (24×8)I | R |
| I I I I I I I I | I 0 0 0 0 0 I R | (24×8)I | R |
| R | I 0 I I I R I R | (24×8)I | |
| Z7 | I I I I I I R | (24×8)I | R |
| R | I 0 0 0 0 0 I R | (24×8)I | R |
| I I I I I I I I | I 0 0 0 0 0 I R | (24×8)I | R |
| R | I 0 I I I R I R | (24×8)I | |

Timing: 125μs, 250μs, 375μs, 500μs

R = FIXED STUFF
I = INFORMATION BIT
O = OVERHEAD BIT

5,544,172

METHOD FOR THE DIGITAL TRANSMISSION OF DATA

BACKGROUND OF THE INVENTION

This invention relates to a method for the digital transmission of data of the kind in which data is transmitted by a system known as a synchronous digital hierarchy (SDH) in which bits of information are fed in a stream and are multiplexed with bits from other streams in a system known as tributaries which are combined or separated by a multiplexer/demultiplexer (MUX). Such a system deals only with signals in digital form and enables an efficient and noise free transmission of data to take place. Signals transmitted under SDH are the subject of international standards and one particular standard is defined in CCITT recommendations G.707, G.708 and G.709. Unfortunately phase distortion can occur in a transmission network corrupting its SDH and this is due to pointer justification.

A solution to deal with this problem is set out in our co-pending British Patent Application No. 9111235.9. That patent application also describes a method of dealing with the problem in which a data stream at the node of a synchronous SDH transmission network has a specified line frequency and is composed of frames. Each frame is constructed as to contain a reference word and the node of the transmission network has a node frequency. In the improved method of that invention the method stores the incoming data stream in a buffer store at the node and uses a line reference of the incoming data stream to extract a data pointer from the data stream for each frame. This data pointer indicates the location of the reference word of that frame in the buffer store. Furthermore the timing pointer is extracted from the incoming data stream utilising the line reference and a line clock, the frequency of which is a multiple of the line reference. The timing pointer so extracted is converted into a reference value by using the node reference and a node clock. The reference value is used to generate a node timing pointer. The node timing pointer is compared with a read address and data pointer and read-out from the buffer store is justified as a result of the comparison which takes place.

The problem arising with the use of the invention described in our previous application is that the pointer information which was added, failed to pass through apparatus transmitting the frames. This obviously is a disadvantage and it is necessary for the pointer information to pass through without any corruption or distortion. It is an object of the present invention to provide an improved method and apparatus which enables the pointer information to pass cleanly through the network.

SUMMARY OF THE INVENTION

According to the present invention there is provided a method and apparatus for use with the method in which the signals to be transmitted are transmitted in virtual containers (VC) in a number of fixed stuff bytes which were hitherto unused. Two of these fixed bytes in each of these signal virtual containers are used to carry the timing information. This allows for up to a 16 bit code for the timing pointers to be provided.

BRIEF DESCRIPTION OF THE DRAWINGS

Preferably the timing resolution is derived from the SDH line signal.

In order to assist with the understanding of the invention, it will now be described by way of example only with reference to the eight figures of the accompanying drawings. These show byte arrangements and mapping structures for use in a transmission network used for the digital transmission of data in an SDH system.

FIG. 3 shows asynchronous mapping of the 34368 Kbits tributary into a VC3.

FIG. 4 and 5 respectively show different asynchronous mappings of a 6312 Kbits tributary whilst

DETAILED DESCRIPTION OF THE PREFERRED EMBODIMENTS

Figure 1:
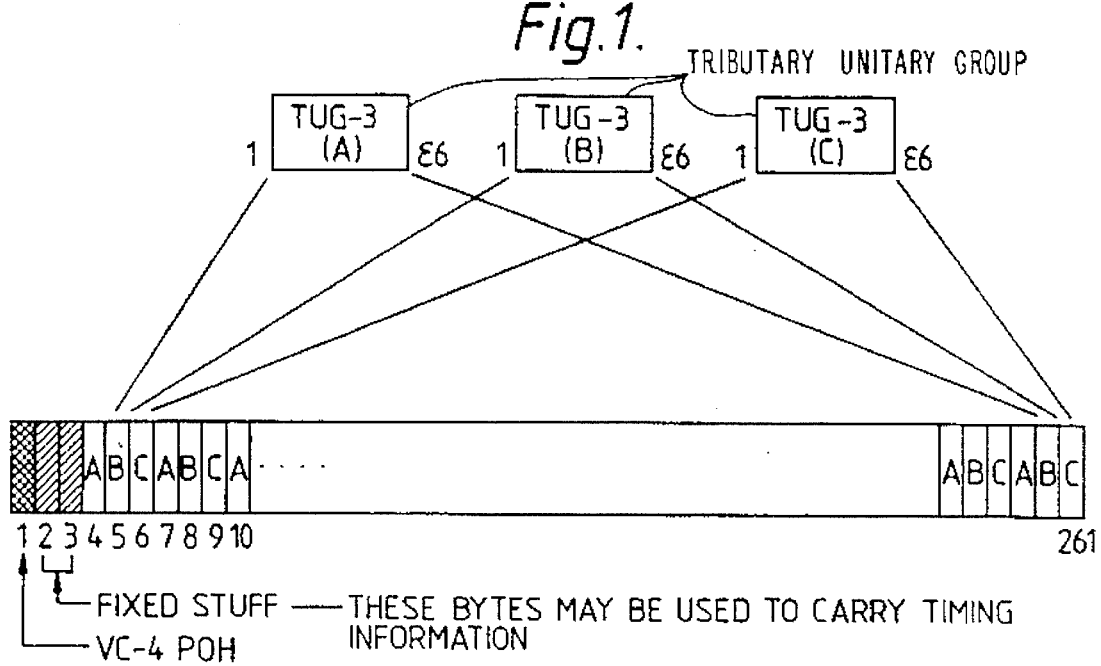
FIG. 1 shows the layout for a virtual container VC4 with TUG 3 multiplexing.
Figure 2:
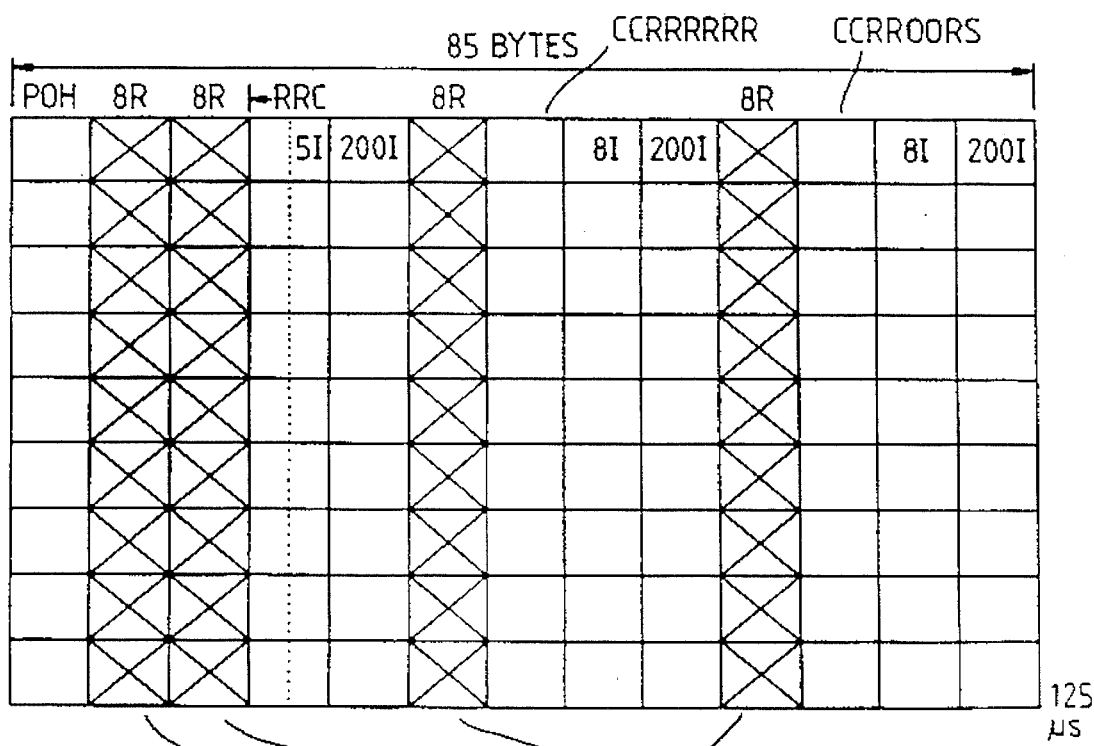
FIG. 2 shows the frame for the synchronous mapping of a 44736 Kbits tributary into VC 32.
Figure 6:
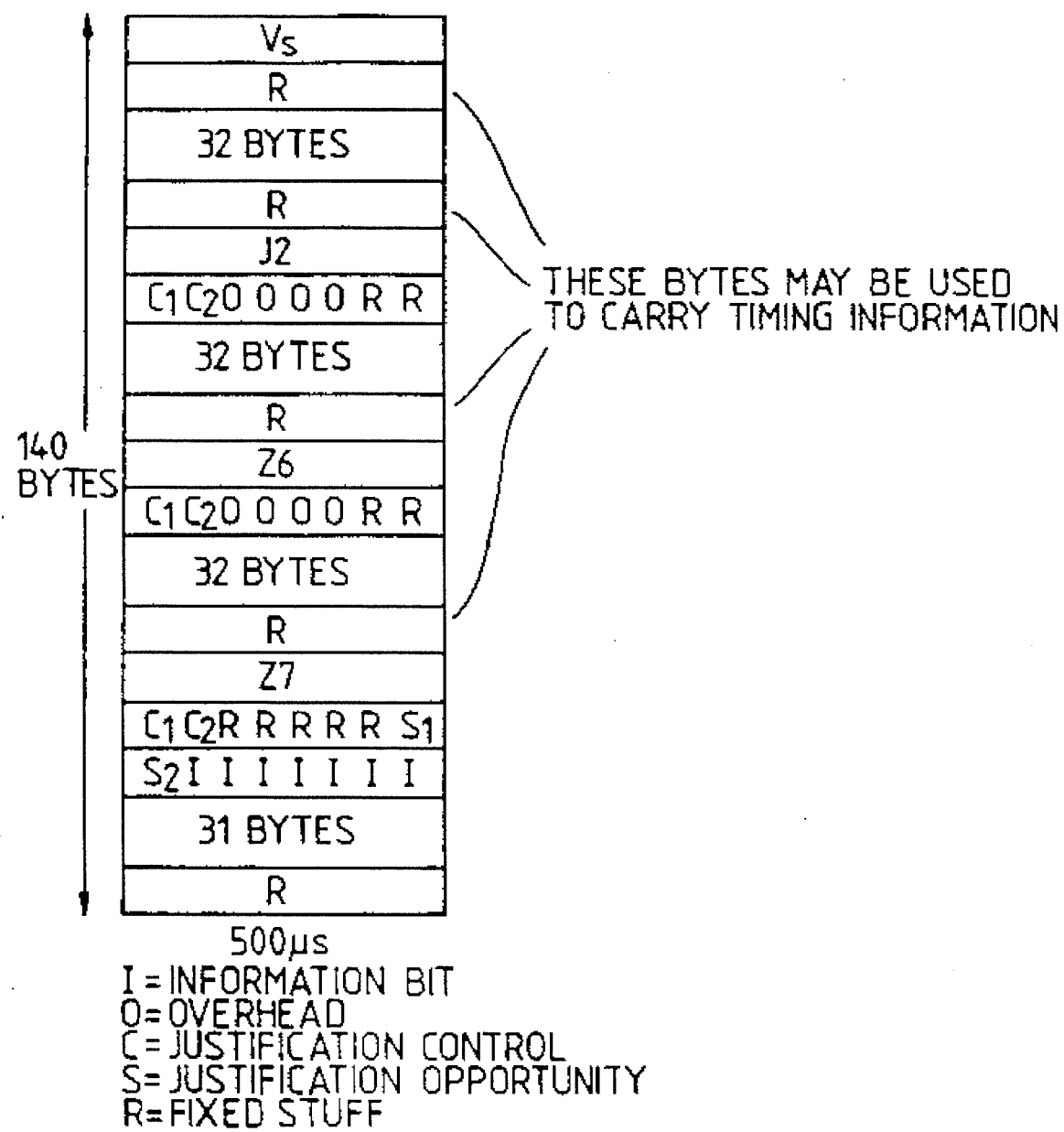
FIG. 6 shows an asynchronous mapping of a 2048 Kbits tributary and FIG. 7 of a 1544 Kbits tributary and FIG. 8 shows synchronous mapping for a 1544 Kbits tributary.

If reference is made particularly to FIGS. 1 to 6, it will be seen that the fixed stuff bytes in positions 2 and 3 are used to carry the timing information. In FIG. 1 these are shown as bytes in columns 2 and 3 with column 1 used as a path overhead for the virtual container 4 (VC-4). FIG. 1 shows TUG 3 multiplexing. How the TUG 3 elements A, B and C are multiplexed is indicated by the lines leading to the elements at the top of the figure. This formation allows for up to a 16 bit code for the timing pointers to be used. The timing resolutions derived from the SDH line signal which can for example be the basic synchronous transport module level 1 (STM-1) which has a bit rate of 155520 Kbits. This gives rise to a timing value of 19.29 nano seconds. A smaller value for example of the order of one third, ie 6.43 ns. may also be used. A timing indicator value is derived from the 8 kHz frame rate and is coded in steps of 19.29 ns. This value as shown may be smaller if required. A code of up to a maximum of 16 bits is generated and inserted in the allocated fixed bytes in the SDH VCs. This 16 bit code is known as a timing pointer or indicator and carries the timing correction for each of the payload signals, for example PDH or ATM carried in the VCs. The timing pointer is transmitted as part of the SDH payload. At the receive side the timing pointer value is extracted from its VC and converted into a reference value by utilising the node reference and a node clock. The reference value is utilised to generate a node timing pointer.

Figure 7:
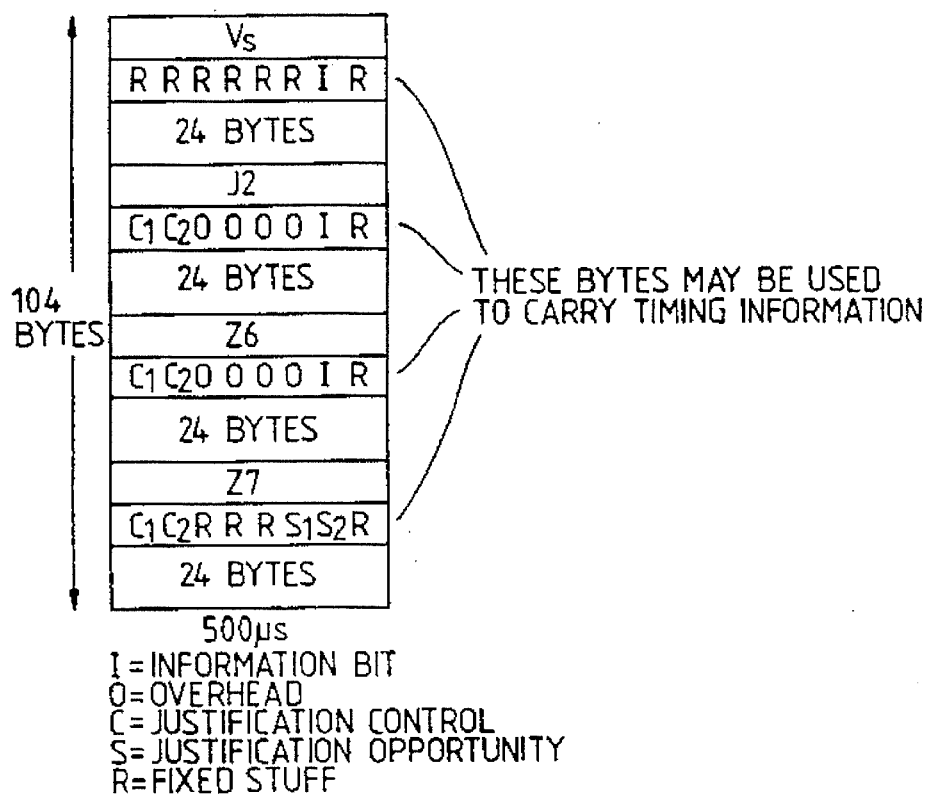
Figure 8:
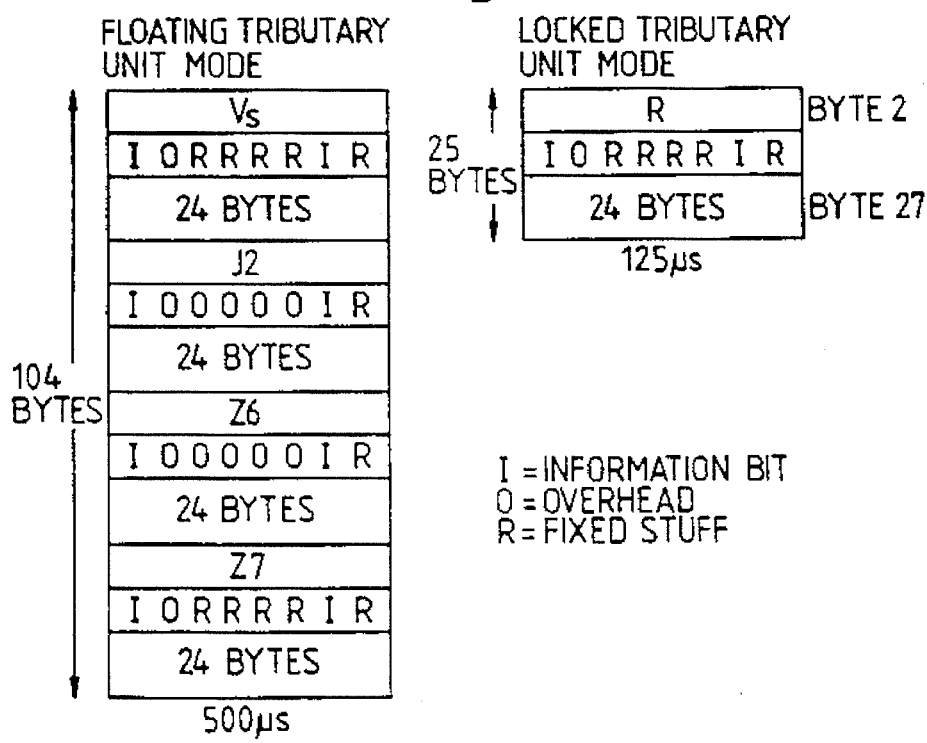

FIGS. 7 and 8 show where the bytes may be used to carry the timing information, again these occur where there are fixed stuff bytes.

It will be appreciated that the invention allows the transfer of timing information in the stuff bytes without any distortion or the signals being rendered unusable. The whole system relies on the use of the timing pointers to carry accurate timing information so that if any phase distortion does occur arising from the transmission, this is corrected.

It will be appreciated that the mappings can take place for other byte configurations than those shown without departing from the scope of the invention.

I claim:

1. A method for the digital transmission of data between nodes in a synchronous digital hierarchy (SDH) network, each node including a multiplexer/demultiplexer (MUX) in which the data is multiplexed from or demultiplexed into tributary streams, the network being operative to carry timing pointers, the method comprising the step of: transmitting the timing pointers in virtual containers (VC) in one or more unused fixed stuff bytes.

2. The method as claimed in claim 1, in which the transmitting step is preformed by using two of the fixed stuff bytes in each of the virtual containers to carry the timing pointers.

3. The method as claimed in claim 1, in which the transmitting step is preformed by deriving timing resolution for use with the timing pointers from an SDH line signal.

4. The method as claimed in claim 1, in which the transmitting step is performed by carrying the timing pointers in the fixed stuff bytes in positions 2 and 3.

5. The method as claimed in claim 1, and further comprising the steps of extracting a timing pointer value from the VC, and converting the timing pointer value to a reference value during receipt of a multiplexed data stream at a node.

6. The method as claimed in claim 5, in which the converting step is performed by using a node reference and a node clock.

7. The method as claimed in claim 5, and further comprising the step of generating a node timing pointer from the reference value.

8. The method as claimed in claim 2, and further comprising the step of generating the timing pointers as a code of up to sixteen bits.

* * * * *